(12) United States Patent
Lim et al.

(10) Patent No.: US 7,149,528 B2
(45) Date of Patent: Dec. 12, 2006

(54) METHOD FOR CONTROLLING OVERLOAD IN DIGITAL MOBILE COMMUNICATION SYSTEM

(75) Inventors: Young-Il Lim, Ichon-shi (KR); Jae-Yong Jeong, Ichon-shi (KR); Myoung-Ki Seol, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 912 days.

(21) Appl. No.: 09/767,563

(22) Filed: Jan. 23, 2001

(65) Prior Publication Data
US 2001/0019954 A1 Sep. 6, 2001

(30) Foreign Application Priority Data
Mar. 2, 2000 (KR) ............................ 2000-10467

(51) Int. Cl.
*H04Q 7/20* (2006.01)
(52) U.S. Cl. .................................... 455/453; 455/422.1
(58) Field of Classification Search ............... 455/453, 455/422, 524, 525, 522, 424, 450, 452, 455, 455/436, 442, 458, 443, 561, 435, 439, 434, 455/423, 422.1, 430, 405; 370/331, 332, 370/342
See application file for complete search history.

(56) References Cited

U.S. PATENT DOCUMENTS

| | | | | |
|---|---|---|---|---|
| 4,974,256 A * | 11/1990 | Cyre et al. .................. 379/113 |
| 5,574,770 A * | 11/1996 | Yoo et al. ...................... 379/34 |
| 5,835,490 A * | 11/1998 | Park et al. .................. 370/342 |
| 5,970,412 A | 10/1999 | Maxemchuk ................ 455/447 |
| 6,005,852 A | 12/1999 | Kokko et al. ................ 370/329 |
| 6,094,585 A | 7/2000 | Dajer et al. .................. 455/522 |
| 6,405,045 B1 * | 6/2002 | Choi et al. ................... 455/453 |
| 6,574,477 B1 * | 6/2003 | Rathunde ..................... 455/453 |
| 2002/0137518 A1 * | 9/2002 | Achour ........................ 455/447 |

* cited by examiner

*Primary Examiner*—Melody Mehrpour
(74) *Attorney, Agent, or Firm*—McDonnell Boehnen Hulbert & Berghoff LLP

(57) ABSTRACT

A method for controlling an overload of a digital mobile communication system. The digital mobile communication system has a base transceiver station and a base station controller each of which has a database. The method for controlling the overload includes the steps of: a) initializing threshold values stored on the database as a predetermined value; b) monitoring each of utility rates of a control processor resource and a call resource; c) comparing the utility rates of the control processor resource and the call resource with the threshold values respectively, thereby obtaining overload grades of the control processor resource and the call resource; d) comparing the overload grade of the control processor resource with the overload grade of the call resource, thereby selecting one of the control processor resource and the call resource as a resource to be controlled, which has a higher overload grade; e) determining whether an overload occurs in the resource to be controlled; and f) if the overload occurs in the resource to be controlled, informing a base station manager of an occurrence in the resource to be controlled.

3 Claims, 2 Drawing Sheets

METHOD FOR CONTROLLING OVERLOAD IN DIGITAL MOBILE COMMUNICATION SYSTEM

FIELD OF THE INVENTION

The present invention relates to a method for controlling an overload in a digital mobile communication system; and, more particularly, to a method for controlling an overload in a code division multiple access (CDMA) system.

PRIOR ART OF THE INVENTION

In a general code division multiple access (CDMA) system, when controlling overload of a base transceiver station (BTS) or a base station controller (BSC), a utility rate of a control processor resource and a utility rate of a call resource are used as references for determination of overload. If the overload occurs, a base station manger (BSM) is informed that the overload occurs in the BTS or the BSC.

When controlling the overload, a priority is given to one of the control processor resource or the call resource. In other words, in case that the priority is given to the call resource and the overload occurs in both of the call resource and the control processor resource, even though the utility rate of the call resource is lower than the utility rate of the control processor resource, the overload of the call resource is firstly controlled. In this case, the overload of the control processor resource having a higher utility rate may cause an abnormal operation, e.g., a congestion, thereby interrupting a call service.

SUMMARY OF THE INVENTION

Therefore, it is an object of the present invention to provide a method for controlling an overload in a digital communication system so that the digital mobile communication system is prevented from being interrupted.

In accordance with an aspect of the present invention, there is provided a method for controlling an overload of a digital mobile communication system having a base transceiver station and a base station controller, wherein each of the base transceiver station and the base station controller has a database, the method comprising the steps of: a) initializing threshold values stored on the database as a predetermined value; b) monitoring each of utility rates of a control processor resource and a call resource; c) comparing the utility rates of the control processor resource and the call resource with the threshold values respectively, thereby obtaining overload grades of the control processor resource and the call resource; d) comparing the overload grade of the control processor resource with the overload grade of the call resource, thereby selecting one of the control processor resource and the call resource as a resource to be controlled, which has a higher overload grade; e) determining whether an overload occurs in the resource to be controlled; and f) if the overload occurs in the resource to be controlled, informing a base station manager of an occurrence in the resource to be controlled.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENT OF THE INVENTION

Hereinafter, preferred embodiments of the present invention will be described in detail with reference to the accompanying drawings.

Figure 1:
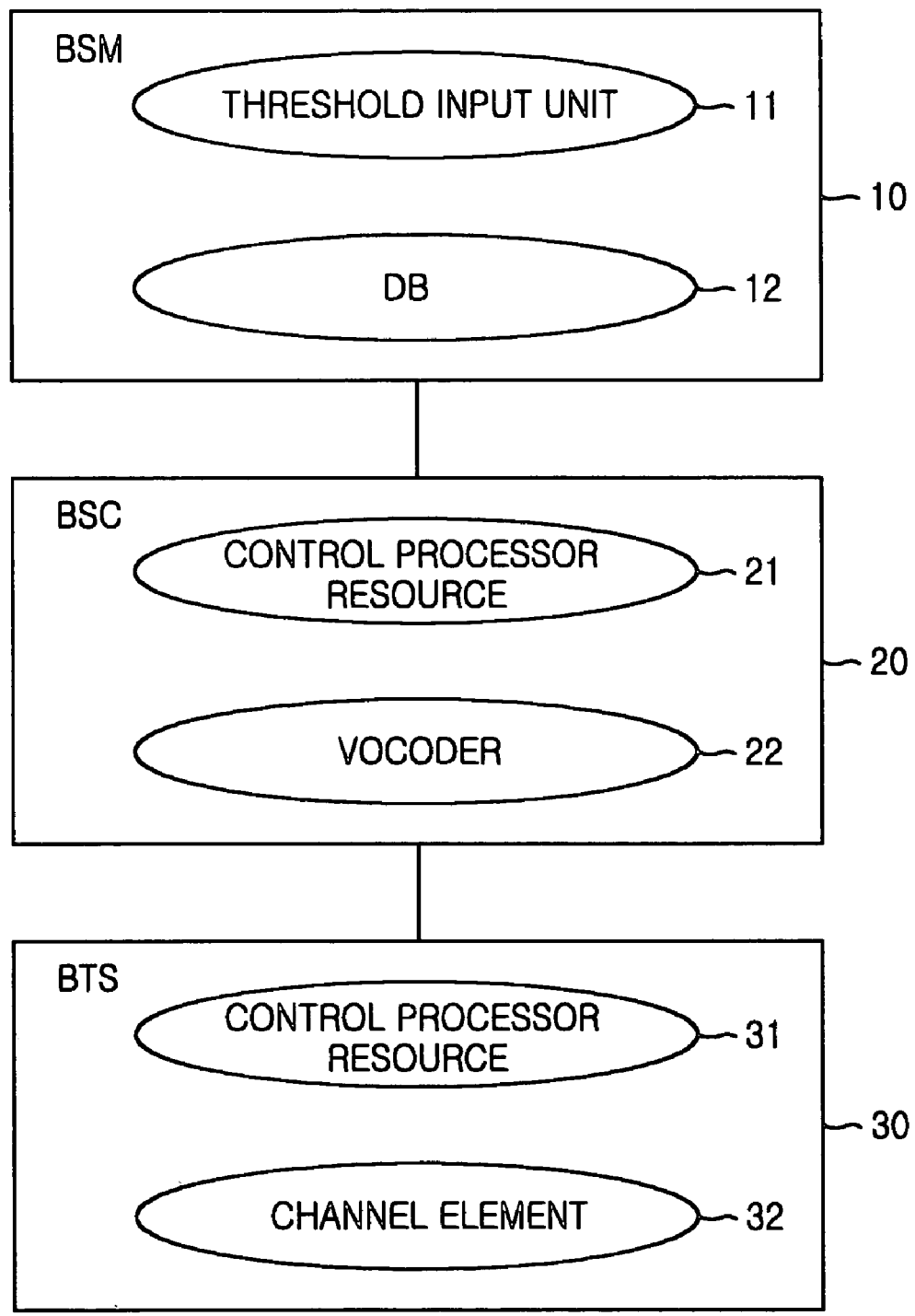
FIG. 1 is a block diagram of a radio network having overload controlling units in accordance with the present invention.

FIG. 1 is a block diagram of a radio network having overload controlling units in accordance with the present invention.

Referring to FIG. 1, the radio network includes a base station manager (BSM) 10, a base station controller (BSC) and a base transceiver station 30. The BSM 10 performs management and maintenance of the BTS and the BSC, e.g., a matching function between managers and printing status of a system.

The BSM 10 includes a threshold input unit 11 receiving a threshold value from a manager and a data base (DB) 12 storing the threshold values.

The BSC 20, which performs a connection between a mobile switching center (MSC) and the BTS 30, a control of a wire/wireless link and a handoff, includes a control processor resource 21 and a vocoder 22 which is a call processor resource.

The BTS 30 includes a control processor resource 31 and a channel element 32 which is a call resource.

Hereinafter, a method for controlling overload of a digital mobile communication system will be described with reference to FIG. 2.

Figure 2:
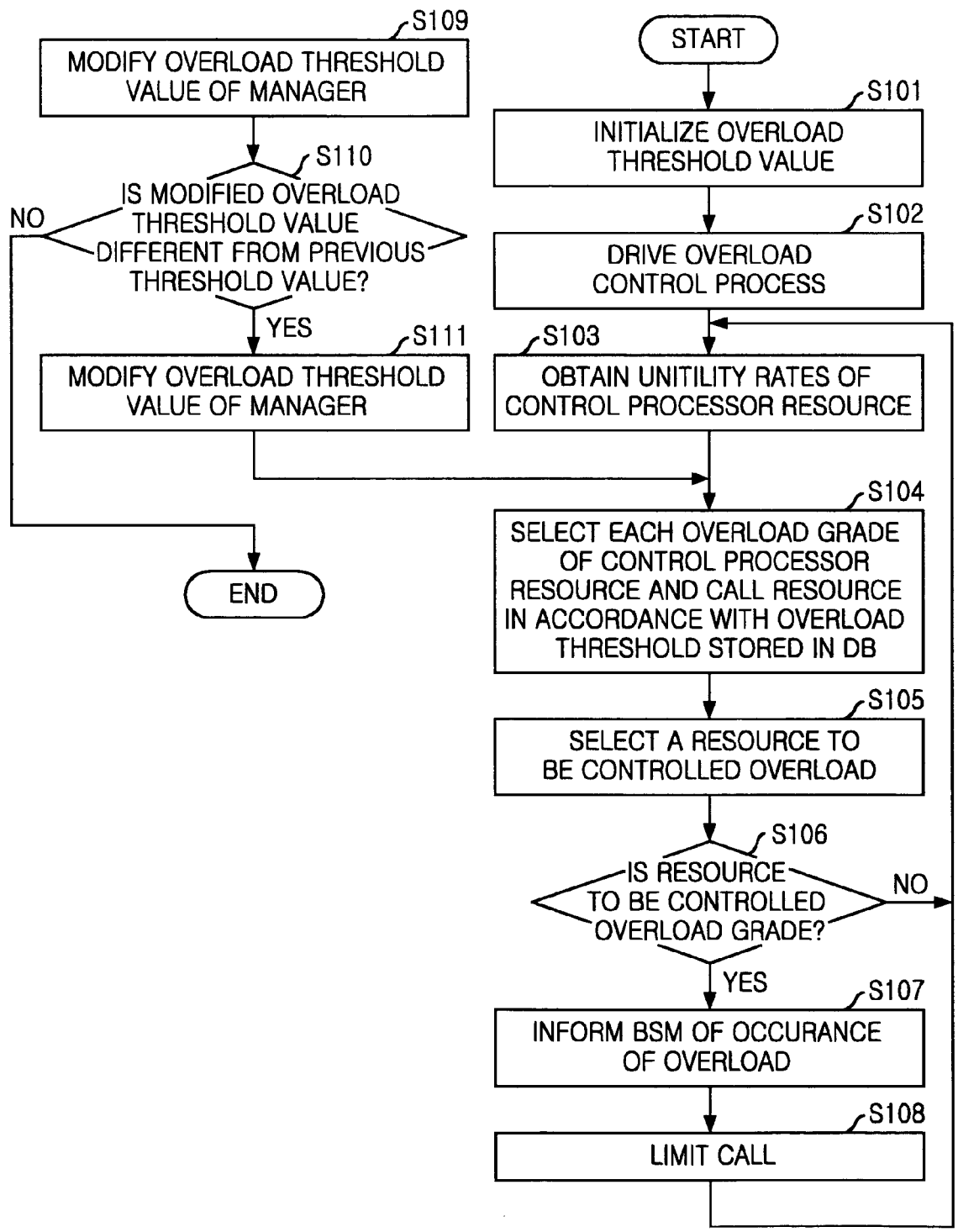
FIG. 2 is a flow chart illustrating a method for controlling overload in a digital communication system in accordance with the present invention.

FIG. 2 is a flow chart illustrating a method for controlling overload in a digital communication system in accordance with the present invention.

First, overload threshold values stored in DB 12 is initialized as predetermined reference values at step S101. The process drives an overload control processor periodically monitoring the overload of the system at step S102.

Utility rates of a control processor resource and a call resource are obtained at step S103, obtained utility rates are compared with the overload threshold values stored on the DB, thereby determining the overload grades of the control processor resource and the call control resource at step S104.

Each of the overload threshold values of the control processor resource and the call resource is classified into 4 grades: a normal overload threshold; a minor overload threshold; a major overload threshold and a critical overload threshold. The overload threshold value of the control processor resource is obtained and stored in the DB independently from the overload threshold value of the call resource at step S104. The overload grade is obtained by comparing the utility rate with the overload threshold value, and, therefore, the overload grade is identified as one of a normal grade, a minor grade, a major grade or a critical grade.

A higher utility rate does not represent a higher overload grade. Since the overload grade is determined by comparing the utility rate with the overload threshold value as mentioned above, if a threshold value of one radio resource is lower than the other threshold value of the other radio resource, the radio resource having a lower utility rate can have a higher overload grade.

A resource is selected as the resource to be controlled overload by comparing the overload grades of two resources at step S105.

It is determined whether the state of the resource to be controlled overload is normal or overload at step S106. If the state of the resource to be controlled overload is overload, in other words, the minor grade, the major grade or the critical grade, the system is determined as the overload, BSM is informed that the overload occurs at step S107. Also, when the overload grade is changed to another grade, the BSM is informed that the overload is changed and information about the overload grades in the previous and the present periods, thereby capable of easily informing the system manager of the change in the overload grade.

If the overload occurs, in response to the overload grade, the call is controlled at step S108.

A system manager can modify the overload threshold value to a predetermined threshold value at step S109. The modified threshold value is compared with the previous threshold value stored on the DB at step S110. If the modified threshold value is different from the previous threshold value, the threshold value is updated as the modified threshold value at step S111. The updated threshold value is used as the threshold value for determining the overload in real time at step S104.

When the overload occurs in both of the control processor resource and the call resource and each of the overload grades is dynamically changed, one of the control processor resource and the call resource having a higher overload grade is selected as a resource of which an overload is to be controlled, and therefore, the change of the overload grade is informed to the system manager. The system manager can monitor information, i.e., a maximum overload grade and the resource to be controlled in the system and control the overload of the system based on the information.

Using the method for controlling an overload of a system in accordance with the present invention, each of the overload threshold values of the BTS and the BSC can be changed to a predetermined value by the system manager, thereby capable of controlling the overload of the system according to environments and a location of each system.

Since a new overload grade can be obtained and the resource of which the overload is to be controlled is selected, the congestion of the system and the interrupt of the call service thereby can be protected in advance and also persons and costs for maintenance of the system can be saved.

Both of the maximum overload grade and the resource having the maximum overload grade are informed to the BSM, and therefore, the system manager can recognize status of the overload of the system within a short time and solve the overload of the system.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for controlling an overload of a digital mobile communication system having a base transceiver station and a base station controller, wherein each of the base transceiver station and the base station controller has a database, the method comprising the steps of:
   a) initializing threshold values stored on the database as predetermined values;
   b) monitoring each of utility rates of a control processor resource and a call resource;
   c) comparing the utility rates of the control processor resource and the call resource with the threshold values respectively, thereby obtaining overload grades of the control processor resource and the call resource;
   d) comparing the overload grade of the control processor resource with the overload grade of the call resource, thereby selecting one of the control processor resource and the call resource as a resource to be controlled, which has a higher overload grade;
   e) determining whether an overload occurs in the resource to be controlled;
   f) if the overload occurs in the resource to be controlled, informing a base station manager of an occurrence in the resource to be controlled; and changing the overload threshold values into predetermined values according to a control signal from the base station manager.

2. The method as recited in claim 1, wherein the overload grade includes a normal grade, a minor grade, a major grade and a critical grade.

3. The method as recited in claim 1, wherein, at step f), an overload grade of a previous period and information about the overload of the current overload grade are transmitted to the base station manager along with the occurrence of the overload.

* * * * *